US012578295B2

(12) United States Patent
Suetsugi et al.

(10) Patent No.: US 12,578,295 B2
(45) Date of Patent: Mar. 17, 2026

(54) ELECTRODE HAVING CARBON LAYER WITH SP3/SP2 BONDING

(71) Applicant: NITTO DENKO CORPORATION, Ibaraki (JP)

(72) Inventors: Tomokazu Suetsugi, Ibaraki (JP); Motoki Haishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 534 days.

(21) Appl. No.: 18/017,389

(22) PCT Filed: Jul. 20, 2021

(86) PCT No.: PCT/JP2021/027108
§ 371 (c)(1),
(2) Date: Jan. 20, 2023

(87) PCT Pub. No.: WO2022/019299
PCT Pub. Date: Jan. 27, 2022

(65) Prior Publication Data
US 2023/0266263 A1 Aug. 24, 2023

(30) Foreign Application Priority Data
Jul. 22, 2020 (JP) ................................. 2020-125152

(51) Int. Cl.
*B32B 15/04* (2006.01)
*B32B 17/06* (2006.01)
*G01N 27/30* (2006.01)

(52) U.S. Cl.
CPC ................................. *G01N 27/308* (2013.01)

(58) Field of Classification Search
CPC ....................................................... G01N 27/308
USPC .................................. 428/698, 699, 701, 702
See application file for complete search history.

(56) References Cited

U.S. PATENT DOCUMENTS

| | | | |
|---|---|---|---|
| 10,605,760 B2 | 3/2020 | Komoto | |
| 12,344,928 B2 * | 7/2025 | Suetsugi | .............. G01N 27/308 |
| 2009/0146111 A1 * | 6/2009 | Shin | ..................... H01G 9/2031 |
| | | | 427/77 |
| 2011/0041980 A1 * | 2/2011 | Kim | ........................ H10K 30/81 |
| | | | 156/60 |
| 2013/0224633 A1 * | 8/2013 | Lee | ........................ H01M 4/583 |
| | | | 136/263 |
| 2014/0322608 A1 * | 10/2014 | Claussen | ................. C01B 32/15 |
| | | | 204/157.43 |

(Continued)

FOREIGN PATENT DOCUMENTS

| | | |
|---|---|---|
| CN | 107167507 A | 9/2017 |
| CN | 110088609 A | 8/2019 |
| JP | 2010-204029 A | 9/2010 |
| JP | 2013-185991 A | 9/2013 |
| JP | 6222233 B2 | 11/2017 |

(Continued)

OTHER PUBLICATIONS

International Search Report issued for corresponding International Patent Application No. PCT/JP2021/027108 on Oct. 5, 2021, along with an English translation (5 pages).

(Continued)

*Primary Examiner* — Lauren R Colgan
(74) *Attorney, Agent, or Firm* — Hauptman Ham, LLP

(57) ABSTRACT

An electrode includes a substrate film, an inorganic oxide layer, a metal underlying layer, and an electrically conductive carbon layer in order toward one side in a thickness direction.

14 Claims, 8 Drawing Sheets

(56) References Cited

U.S. PATENT DOCUMENTS

| | | | | |
|---|---|---|---|---|
| 2017/0153200 | A1* | 6/2017 | Komoto | G01N 27/308 |
| 2018/0149610 | A1 | 5/2018 | Diguet et al. | |
| 2021/0172897 | A1* | 6/2021 | Haishi | G01N 27/304 |
| 2023/0266263 | A1* | 8/2023 | Suetsugi | G01N 27/308 |
| | | | | 204/400 |

FOREIGN PATENT DOCUMENTS

| | | |
|---|---|---|
| JP | 2019-105637 A | 6/2019 |
| WO | 2016/013478 A1 | 1/2016 |
| WO | 2021/009845 A1 | 1/2021 |

OTHER PUBLICATIONS

Written Opinion issued for corresponding International Patent Application No. PCT/JP2021/027108 on Oct. 5, 2021 (4 pages).

The Extended European Search Report issued on Jul. 31, 2024 for corresponding European Patent Application No. 21846785.0 (6 pages).

Office Action issued on Jan. 21, 2025 for corresponding Japanese Patent Application No. 2022-538018, along with an English machine translation (6 pages).

International Preliminary Report on Patentability (PCT/IB/326) issued on Feb. 2, 2023 for corresponding International Patent Application No. PCT/JP2021/027108 (6 pages).

International Preliminary Report on Patentability (PCT/IB/338) Issued on Feb. 2, 2023 for corresponding International Patent Application No. PCT/JP2021/027108 (6 pages).

Office Action issued on Nov. 27, 2024 for corresponding Taiwanese Patent Application No. 110126958 along with an English translation (9 pages).

Communication pursuant to Article 94(3) EPC issued on Dec. 15, 2025 for corresponding European Patent Application No. 21 846 785.0 (5 pages).

* cited by examiner

1

Example1

1mm

Example1

1mm

Example2

1mm

Example2

1mm

Comparative
example1

1mm

Comparative
example1

1mm

Comparative
example2

1mm

Comparative
example2

1mm

ELECTRODE HAVING CARBON LAYER WITH SP3/SP2 BONDING

CROSS REFERENCE TO RELATED APPLICATION

This application is a National Stage of International Application No. PCT/JP2021/027108, filed on Jul. 20, 2021, which designates the United States and was published in Japan, and which is based upon and claims priority to Japanese Patent Application No. 2020-125152, filed on Jul. 22, 2020 in the Japan Patent Office. All of the aforementioned applications are hereby incorporated by reference in their entireties.

TECHNICAL FIELD

The present invention relates to an electrode.

BACKGROUND ART

Conventionally, an electrode including a film substrate, a titanium thin film, and a carbon thin film in order in a thickness direction has been known (ref: for example, Patent Document 1 below).

In the electrode described in Patent Document 1, chemical stability in a short time is also improved, while electrical conductivity is improved by the titanium thin film.

CITATION LIST

Patent Document

Patent Document 1: No. WO2016/013478

SUMMARY OF THE INVENTION

Problem to be Solved by the Invention

Thus, the electrode may be immersed in an electrolytic solution for a long period of time. The electrode is required to suppress damage in the above-described case. That is to say, the electrode is required to have excellent electrolytic solution durability.

However, there is a problem that the electrode described in Patent Document 1 does not have the above-described excellent electrolytic solution durability.

The present invention provides an electrode having excellent electrolytic solution durability.

Means for Solving the Problem

The present invention (1) includes an electrode including a substrate film, an inorganic oxide layer, a metal underlying layer, and an electrically conductive carbon layer in order toward one side in a thickness direction.

The present invention (2) includes the electrode described in (1), wherein the metal underlying layer is capable of forming carbide of carbon of the electrically conductive carbon layer.

The present invention (3) includes the electrode described in (1) or (2), wherein the inorganic oxide layer is a metal oxide layer or a semi-metal oxide layer.

The present invention (4) includes the electrode described in (3), wherein the metal oxide layer and the metal underlying layer contain the same metal element.

The present invention (5) includes the electrode described in (4), wherein the metal element is titanium.

The present invention (6) includes the electrode described in any one of (3) to (5), wherein the semi-metal oxide layer contains silicon dioxide.

The present invention (7) includes the electrode described in any one of (1) to (6), wherein a thickness of the metal oxide layer is 5 nm or more.

The present invention (8) includes the electrode described in any one of (1) to (7) being an electrode for electrochemical measurement.

Effect of the Invention

The electrode of the present invention has excellent electrolytic solution durability.

BRIEF DESCRIPTION OF THE DRAWINGS

FIG. 5A illustrating the electrode before being immersed in an electrolytic solution and FIG. 5B illustrating the electrode after being immersed in the electrolytic solution.

FIG. 6A illustrating the electrode before being immersed in an electrolytic solution and FIG. 6B illustrating the electrode after being immersed in the electrolytic solution.

FIG. 7A illustrating the electrode before being immersed in an electrolytic solution and FIG. 7B illustrating the electrode after being immersed in the electrolytic solution.

FIG. 8A illustrating the electrode before being immersed in an electrolytic solution and FIG. 8B illustrating the electrode after being immersed in the electrolytic solution.

DESCRIPTION OF EMBODIMENTS

One Embodiment

One embodiment of an electrode of the present invention is described with reference to FIGS. 1 to 2.

Figure 1:
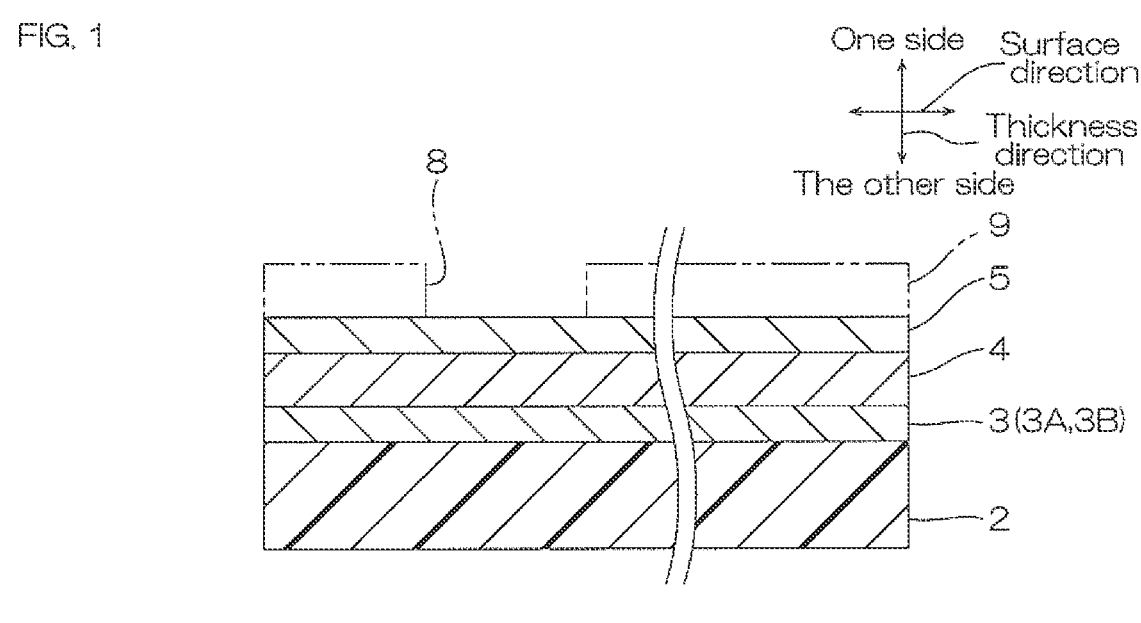
FIG. 1 shows a cross-sectional view of one embodiment of an electrode of the present invention.

As shown in FIG. 1, an electrode 1 has a predetermined thickness. The electrode 1 has a film shape (including a sheet shape). The electrode 1 includes a substrate film 2, an inorganic oxide layer 3, a metal underlying layer 4, and an electrically conductive carbon layer 5 in order toward one side in a thickness direction. Specifically, the electrode 1 includes only the substrate film 2, the inorganic oxide layer 3, the metal underlying layer 4, and the electrically conductive carbon layer 5.

The substrate film 2 has a predetermined thickness. Examples of a material for the substrate film 2 include inorganic materials and organic materials. These may be used alone or in combination of two or more. Examples of the inorganic material include silicon and glass. These may be used alone or in combination of two or more. Examples of the organic material include resin materials. Examples of the resin material include polyester resins, acetate resins, polyether sulfone resins, polycarbonate resins, polyamide resins, polyimide resins, polyolefin resins, acrylic resins, polyvinyl chloride resins, polyvinylidene chloride resins, polystyrene resins, polyvinyl alcohol resins, polyarylate resins, and polyphenylene sulfide resins. These may be used alone or in combination of two or more.

As the material for the substrate film 2, preferably, an organic material is used, more preferably, a polyester resin is used. Specific examples of the polyester resin include polyethylene terephthalate and polyethylene naphthalate. As the polyester resin, preferably, polyethylene terephthalate is used.

A thickness of the substrate film 2 is not particularly limited. The thickness of the substrate film 2 is, for example, 2 μm or more, preferably 20 μm or more, and for example, 1000 μm or less, preferably 500 μm or less.

The inorganic oxide layer 3 is disposed on one surface in the thickness direction of the substrate film 2. Specifically, the inorganic oxide layer 3 is in contact with the entire one surface in the thickness direction of the substrate film 2. The inorganic oxide layer 3 has a predetermined thickness.

Examples of the inorganic oxide layer 3 include a metal oxide layer 3A and a semi-metal oxide layer 3B.

The metal oxide layer 3A is passive. Specifically, the passivity is made of a metal oxide. Examples of the metal oxide include nickel oxide, cobalt oxide, chromium oxide, titanium oxide, aluminum oxide, tungsten oxide, molybdenum oxide, and composite oxide of these. These may be used alone or in combination of two or more. Preferably, titanium oxide is used from the viewpoint of further improving electrolytic solution durability.

The semi-metal oxide layer 3B is made of a semi-metal oxide. The semi-metal is not limited. Examples of the semi-metal include silicon, antimony, germanium, and bismuth. As the semi-metal, preferably, silicon is used. Specific examples of the semi-metal oxide include silicon oxide, antimony oxide, germanium oxide, and bismuth oxide. Further, examples of the semi-metal oxide include glass such as borosilicate glass. As the semi-metal oxide, preferably, silicon oxide is used from the viewpoint of further improving the electrolytic solution durability. Examples of the silicon oxide include silicon dioxide (silica) and silicon monoxide, and preferably, silicon dioxide is used.

The thickness of the inorganic oxide layer 3 is not particularly limited. The thickness of the inorganic oxide layer 3 is, for example, 1 nm or more, preferably 5 nm or more, and for example, 50 nm or less, preferably 25 nm or less.

When the thickness of the inorganic oxide layer 3 is the above-described lower limit or more, the inorganic oxide layer 3 has excellent uniformity over a plane direction. The plane direction is a direction perpendicular to the thickness direction. Therefore, the inorganic oxide layer 3 becomes a continuous film, and the effect of improving electrode durability can be expected.

On the other hand, when the thickness of the inorganic oxide layer 3 is the above-described upper limit or less, the inorganic oxide layer 3 (particularly, the metal oxide layer 3A) also has excellent electrical conductivity.

The metal underlying layer 4 is disposed on one surface in the thickness direction of the inorganic oxide layer 3. Specifically, the metal underlying layer 4 is in contact with the entire one surface in the thickness direction of the inorganic oxide layer 3. The metal underlying layer 4 has a predetermined thickness.

The material for the metal underlying layer 4 is a metal. The metal is preferably capable of forming carbide of carbon of the electrically conductive carbon layer 5 to be described next. That is, the metal is capable of reacting with carbon of the electrically conductive carbon layer 5 and forming carbide. Specifically, examples of the metal include the group 2 elements and the group 4 elements to the group 14 elements in the periodic table, and alloys of these. These may be used alone or in combination of two or more.

Further, the metal underlying layer 4 and the metal oxide layer 3A include, for example, the same metal element.

As the metal for the material of the metal underlying layer 4, from the viewpoint of ensuring chemical stability of the electrically conductive carbon layer 5, preferably, the group 4 element is used, more preferably, titanium and zirconium are used, further more preferably, titanium is used.

Particularly preferably, the metal oxide layer 3A and the metal underlying layer 4 contain titanium as an element. Since when the metal oxide layer 3A and the metal underlying layer 4 contain titanium, it is possible to improve adhesion between the metal oxide layer 3A and the metal underlying layer 4, which is advantageous. When the metal oxide layer 3A contains titanium, the material for the metal oxide layer 3A is titanium oxide. The material for the metal underlying layer 4 is titanium as a metal.

The electrically conductive carbon layer 5 is disposed on one surface in the thickness direction of the metal underlying layer 4. Specifically, the electrically conductive carbon layer 5 is in contact with the entire one surface in the thickness direction of the metal underlying layer 4. The electrically conductive carbon layer 5 has a predetermined thickness.

The material for the electrically conductive carbon layer 5 is carbon, and preferably, carbon having $sp^2$ bonding and $sp^3$ bonding is used. The carbon having $sp^2$ bonding and $sp^3$ bonding has a graphite-type structure and a diamond structure. A ratio $(sp^3/sp^3+sp^2)$ of the number of $sp^3$-bonded atoms to the sum of the number of $sp^3$-bonded atoms and the number of $sp^2$-bonded atoms is not particularly limited. The above-described ratio $(sp^3/sp^3+sp^2)$ is, for example, 0.1 or more, preferably 0.2 or more, and for example, 0.9 or less, preferably, 0.5 or less. The ratio $(sp^3/sp^3+sp^2)$ is calculated based on the peak strength of the $sp^2$ bonding and the peak strength of the $sp^3$ bonding in the spectrum obtained by measuring one surface in the thickness direction of the electrically conductive carbon layer 5 by X-ray photoelectron spectroscopy.

In one surface in the thickness direction of the electrically conductive carbon layer 5, a concentration ratio (O/C) of oxygen to carbon is not particularly limited. The above-described concentration ratio (O/C) is, for example, 0.15 or less, preferably 0.10 or less, and for example, above 0.00, 0.01 or more, 0.02 or more, furthermore 0.03 or more. A concentration ratio is calculated based on the peak area of C1s and the peak area of O1s in the spectrum obtained by measuring one surface in the thickness direction of the electrically conductive carbon layer 5 by the X-ray photoelectron spectroscopy.

A surface resistance value on one surface in the thickness direction of the electrically conductive carbon layer 5 is not particularly limited. The surface resistance of the electrically conductive carbon layer 5 is, for example, $1.0 \times 10^4 \Omega/\square$ or less, preferably $1.0 \times 10^3 \Omega/\square$ or less. The surface resistance can be measured by a four-terminal method in conformity with JIS K 7194.

The thickness of the electrically conductive carbon layer 5 is not particularly limited. The thickness of the electrically conductive carbon layer 5 is, for example, 5 nm or more, more preferably 10 nm or more, and for example, 200 nm or less, more preferably 100 nm or less. The thickness of the electrically conductive carbon layer 5 is calculated by measurement of X-ray reflectance.

Further, preferably, a carbide layer (not shown) is formed at the interface between the electrically conductive carbon layer 5 and the metal underlying layer 4. The carbide layer consists of a carbide which is a compound of the metal of the metal underlying layer 4 and the carbon of the electrically conductive carbon layer 5. The adhesive force between the electrically conductive carbon layer 5 and the metal underlying layer 4 is improved by the carbide layer. In this case, the electrode 1 includes the substrate film 2, the inorganic oxide layer 3, the metal underlying layer 4, the carbide layer which is not shown, and the electrically conductive carbon layer 5 in order toward one side in the thickness direction.

Next, a method for producing the electrode 1 is described. First, the substrate film 2 is prepared. Next, the inorganic oxide layer 3, the metal underlying layer 4, and the electrically conductive carbon layer 5 are formed in order on one side in the thickness direction of the substrate film 2.

Examples of a method for forming the inorganic oxide layer 3 include a dry method and a wet method. Preferably, a dry method is used. Examples of the dry method include a PVD method (physical vapor deposition method) and a CVD method (chemical vapor deposition method). As the dry method, preferably, a PVD method is used. Examples of the PVD method include a sputtering method, a vacuum deposition method, a laser deposition method, and an ion plating method (arc deposition method). As the PVD method, preferably, a sputtering method is used. The sputtering method is not particularly limited. Examples of the sputtering method include an unbalanced magnetron sputtering method (UBM sputtering method), a large power pulse sputtering method, an electron cyclotron resonance sputtering method, an RF sputtering method, a DC sputtering method (DC magnetron sputtering method), a DC pulse sputtering method, and an ion beam sputtering method.

Further, in the sputtering method, for example, a sputtering gas containing oxygen and an inert gas, and a target made of an inorganic material are used.

An example of the inert gas includes argon. A flow ratio of oxygen to the total flow rate of the sputtering gas is, for example, 0.01 or more, preferably 0.05, and for example, below 0.5, preferably 0.2 or less.

Examples of the inorganic material include metals and semi-metals.

An example of the metal includes a metal element which forms a metal oxide. Examples of the metal include nickel, cobalt, chromium, titanium, aluminum, tungsten, molybdenum, and alloys of these. Preferably, titanium is used from the viewpoint of chemical stability.

An example of the semi-metal includes the above-described semi-metal, and preferably, silicon is used.

An example of the method for forming the metal underlying layer 4 includes the same method as the above-described forming method of the inorganic oxide layer 3. However, when the metal underlying layer 4 is formed by a sputtering method, a sputtering gas which contains only an inert gas without containing oxygen is used.

Further, as the target material, preferably, the same target material as that used in forming the metal oxide layer 3A is used, more preferably, titanium is used. In the formation of the metal oxide layer 3A and the formation of the metal underlying layer 4, since the target made of titanium can be common, it is easy to design a production facility.

An example of the method for forming the electrically conductive carbon layer 5 includes the same method as the above-described forming method of the inorganic oxide layer 3. However, when the electrically conductive carbon layer 5 is formed by the sputtering method, the sputtering gas which contains only the inert gas without containing the oxygen is used. When the electrically conductive carbon layer 5 is formed by the sputtering method, as the target material, for example, carbon is used, preferably, sintered carbon is used. Thereafter, if necessary, the electrically conductive carbon layer 5 may be subjected to surface treatment.

<Function and Effect of One Embodiment>

Then, since the electrode 1 includes the substrate film 2, the inorganic oxide layer 3, the metal underlying layer 4, and the electrically conductive carbon layer 5 in order toward one side in the thickness direction, it has excellent electrolytic solution durability.

Figure 2:
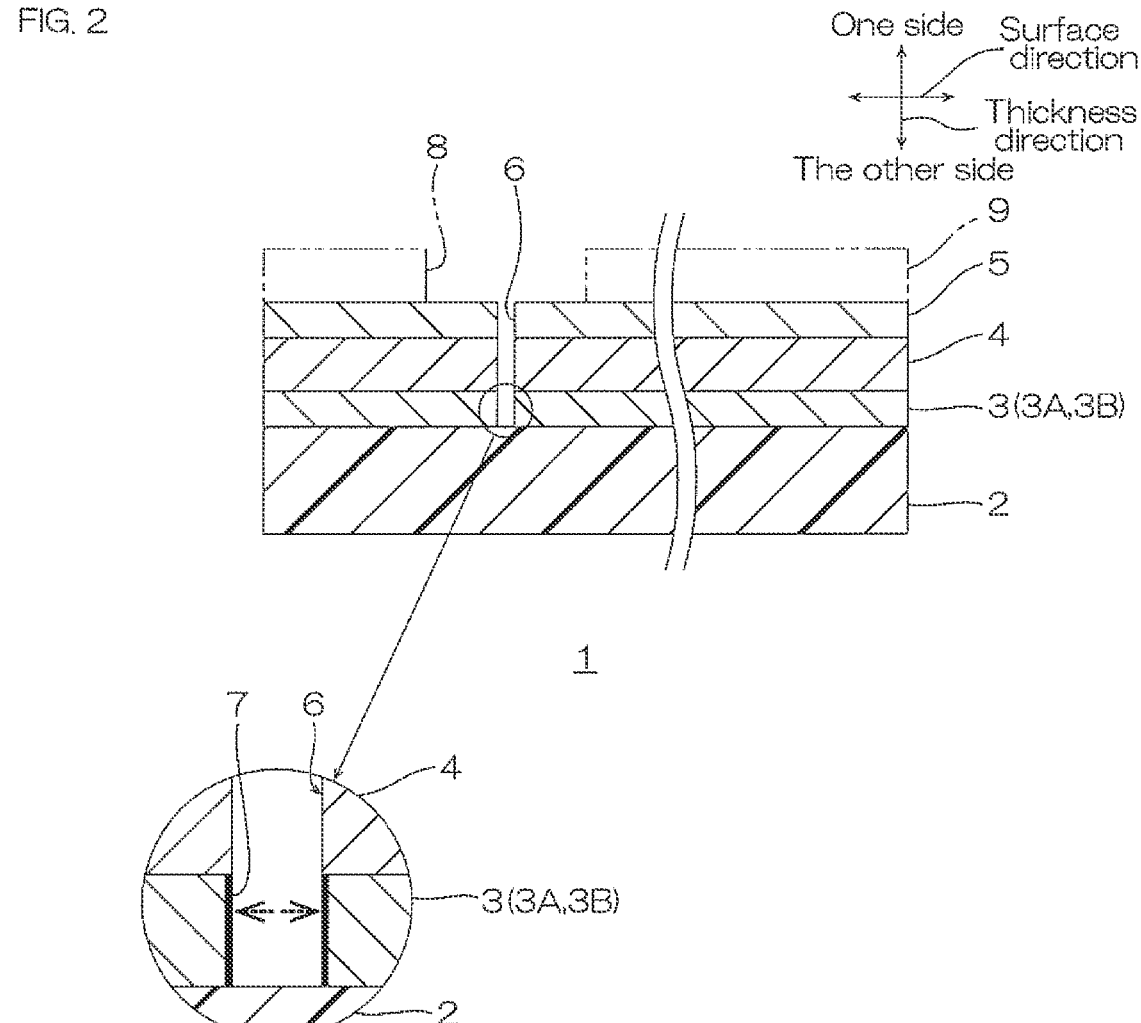
FIG. 2 shows a cross-sectional view of an electrode in which a pinhole is formed.

However, as shown in FIG. 2, there is a case where a pinhole 6 is inevitably formed in the electrode 1 due to its production. The pinhole 6 is a hole penetrating the inorganic oxide layer 3, the metal underlying layer 4, and the electrically conductive carbon layer 5 in the thickness direction. For example, when a foreign matter (dust) is inevitably laminated (deposited) on one surface in the thickness direction of the substrate film 2 during transportation of the substrate film 2, the inorganic oxide layer 3, the metal underlying layer 4, and the electrically conductive carbon layer 5 are formed on one side in the thickness direction of the foreign matter. Since the adhesive force between the foreign matter and the substrate film 2 is significantly low, when the foreign matter is detached from one surface in the thickness direction of the substrate film 2, a portion corresponding to the inorganic oxide layer 3, the metal underlying layer 4, and the electrically conductive carbon layer 5 is also detached. Thus, the above-described pinhole 6 is inevitably formed.

Then, when the electrode 1 is immersed in a corrosive electrolytic solution, the electrolytic solution fills the pinhole 6.

Figure 3:
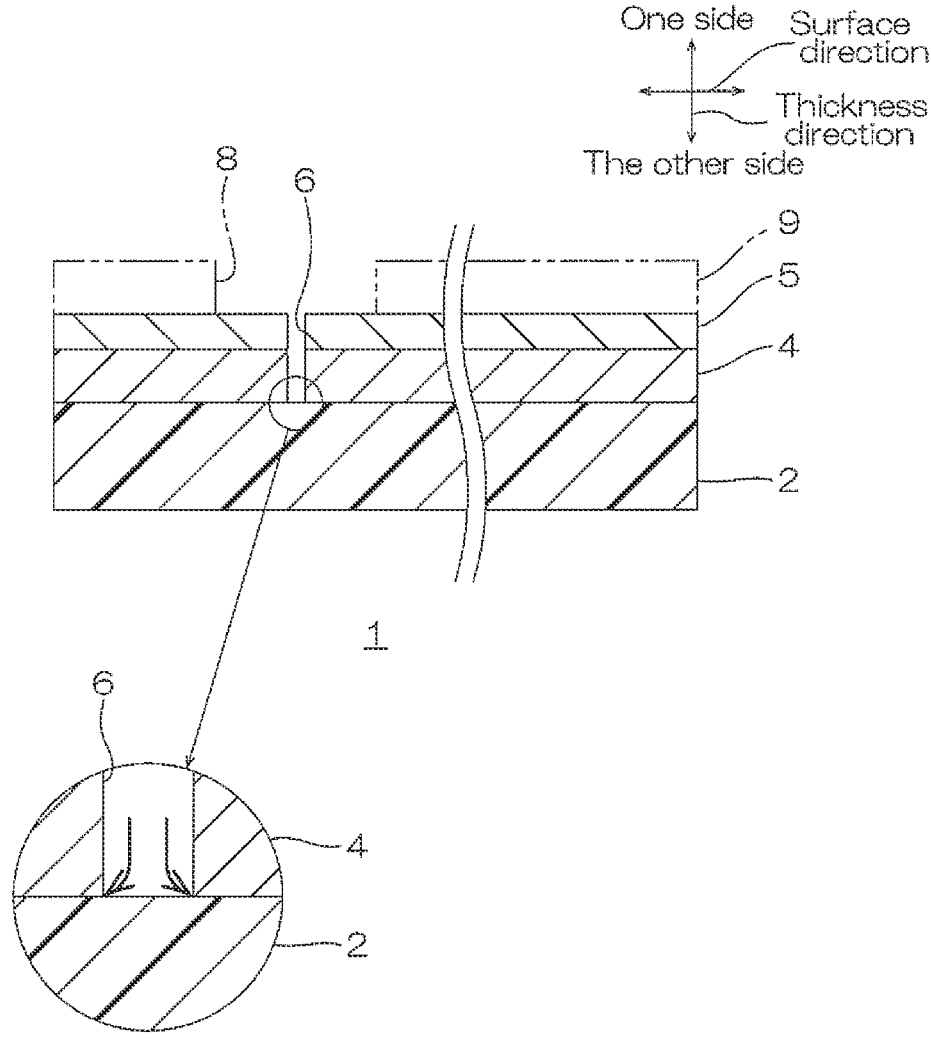
FIG. 3 shows a cross-sectional view of an electrode of Comparative Example 1.

However, as shown in FIG. 3, as in Patent Document 1, in the electrode 1 without including the inorganic oxide layer 3, as shown by thick line arrows, the electrolytic solution infiltrates the interface between the metal underlying layer 4 and the substrate film 2 from the pinhole 6. Therefore, the metal underlying layer 4 is easily peeled from one surface in the thickness direction of the substrate film 2. Therefore, the electrode 1 of FIG. 3 has insufficient electrolytic solution durability.

In the present application, the electrolytic solution durability means that the electrically conductive carbon layer 5 is hardly damaged when the electrode 1 is immersed in the electrolytic solution for a long period of time. Specifically, the electrolytic solution durability means that the electrically conductive carbon layer 5 is hardly damaged when the electrode 1 is immersed in the electrolytic solution for, for example, 5 days or more, furthermore 10 days or more, furthermore 15 days or more, furthermore 20 days or more.

Figure 4:
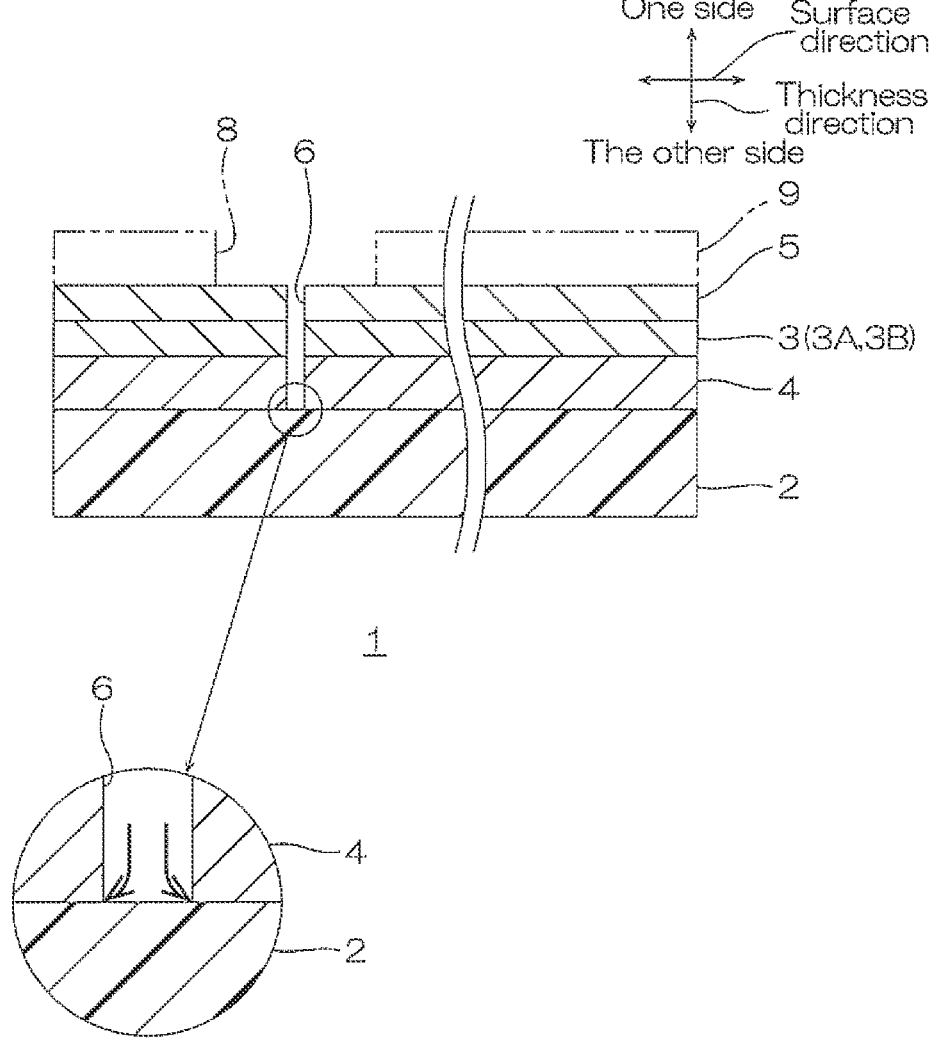
FIG. 4 shows a cross-sectional view of an electrode of Comparative Example 2.

Further, as shown in FIG. 4, even in a layer configuration of replacing the formation order of the inorganic oxide layer 3 and the metal underlying layer 4, the metal underlying layer 4 is in contact with one surface in the thickness direction of the substrate film 2. Therefore, as shown by the arrows of FIG. 4, the electrolytic solution infiltrates the interface between the metal underlying layer 4 and the substrate film 2 from the pinhole 6.

However, in the present embodiment, as shown in FIG. 2, even when the electrolytic solution fills the pinhole 6, the inorganic oxide layer 3 is provided between the metal underlying layer 4 and the substrate film 2. Therefore, it is possible to suppress the infiltration of the electrolytic solution between the metal underlying layer 4 and the substrate film 2 by the inorganic oxide layer 3. In other words, the inorganic oxide layer 3 can function as a barrier layer against the electrolytic solution. Specifically, in the inorganic oxide layer 3, an inner peripheral surface 7 facing the pinhole 6 becomes a stopper portion.

On the other hand, it is concerned that the electrolytic solution infiltrates the interface between the electrically conductive carbon layer 5 and the metal underlying layer 4, and the peeling of the electrically conductive carbon layer 5 from the metal underlying layer 4 occurs. However, in the present embodiment, the carbide layer is formed at the interface between the electrically conductive carbon layer 5 and the metal underlying layer 4. Therefore, the adhesive force between the electrically conductive carbon layer 5 and the metal underlying layer 4 is improved, and it is possible to suppress the above-described infiltration. Therefore, it is also possible to suppress the peeling of the electrically conductive carbon layer 5 from the metal underlying layer 4.

Further, when the metal oxide layer 3A and the metal underlying layer 4 are the same metal element, it is possible to improve the adhesion between the metal oxide layer 3A and the metal underlying layer 4. Furthermore, since the metal oxide layer 3A and the metal underlying layer 4 can use the target made of the same metal element, it is possible to use a common film forming chamber. Therefore, it is possible to produce the electrode 1 by a compact production facility.

More specifically, when both the metal oxide layer 3A and the metal underlying layer 4 contain titanium as an element, the chemical stability of the electrode 1 is excellent. Furthermore, in the formation of the metal oxide layer 3A and in the formation of the metal underlying layer 4, since the target made of titanium is common, it is easy to design the production facility.

Further, when the inorganic oxide layer 3 is the semi-metal oxide layer 3B, therefore, it is possible to effectively suppress the infiltration of the electrolytic solution between the metal underlying layer 4 and the substrate film 2 by the semi-metal oxide layer 3B. Therefore, the electrode 1 including the semi-metal oxide layer 3B has excellent electrolytic solution durability.

Furthermore, when the thickness of the inorganic oxide layer 3 is 5 nm or more, the uniformity of the inorganic oxide layer 3 over the plane direction is excellent.

<Application of Electrode 1>

The application of the electrode 1 is not particularly limited. Examples of the application of the electrode 1 include electrodes for electrochemical measurement. Specifically, the electrode 1 is provided in an electrochemical measurement system as a working electrode.

EXAMPLES

Next, the present invention is further described based on Examples and Comparative Examples below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

The substrate film 2 made of polyethylene terephthalate and having a thickness of 50 μm was prepared.

Next, the metal oxide layer 3A (the inorganic oxide layer 3) made of titanium oxide was formed on one surface in the thickness direction of the substrate film 2 using a magnetron sputtering method. The conditions of the magnetron sputtering method were as follows.

Target material: titanium
Target power: 100 W
Sputtering gas: argon and oxygen (flow ratio of 9:1)
Pressure of sputtering chamber: 0.2 Pa
The thickness of the metal oxide layer 3A was 5 nm.

The metal underlying layer 4 made of titanium was formed on one surface in the thickness direction of the metal oxide layer 3A using the magnetron sputtering method. The conditions of the magnetron sputtering method were as follows.

Target material: titanium
Target power: 100 W
Sputtering gas: argon
Pressure of sputtering chamber: 0.2 Pa
The thickness of the metal underlying layer 4 was 12 nm.

The electrically conductive carbon layer 5 was formed on one surface in the thickness direction of the metal underlying layer 4 by a DC pulse sputtering method. The conditions of the DC pulse sputtering method were as follows.

Target material: sintered carbon
Argon gas pressure: 0.4 Pa
Target power: 3.3 W/cm$^2$
Temperature: 120° C. or less The surface resistance of the electrically conductive carbon layer 5 was 130Ω/□. The ratio (sp$^3$/sp$^3$+sp$^2$) in the electrically conductive carbon layer 5 was 0.35. In the electrically conductive carbon layer 5, the concentration ratio (O/C) of oxygen to carbon was 0.06. The thickness of the electrically conductive carbon layer 5 was 30 nm.

Thus, the electrode 1 including the substrate film 2, the metal oxide layer 3A, the metal underlying layer 4, and the electrically conductive carbon layer 5 in order toward one side in the thickness direction was produced.

Example 2

The process was carried out in the same manner as in Example 1, except that the thickness of the metal oxide layer 3A was changed to 2 nm.

Example 3

The process was carried out in the same manner as in Example 1, except that the semi-metal oxide layer 3B was formed instead of the metal oxide layer 3A. That is, the semi-metal oxide layer 3B made of silicon dioxide (the inorganic oxide layer 3) was formed on one surface in the thickness direction of the substrate film 2 by a magnetron sputtering method. The conditions of the magnetron sputtering method were as follows.

Target material: silicon
Target power: 700 W
Sputtering gas: argon and oxygen (flow ratio of 7:3)
Pressure of sputtering: 0.3 Pa
The thickness of the semi-metal oxide layer 3B was 10 nm.

Example 4

The process was carried out in the same manner as in Example 1, except that the thickness of the semi-metal oxide layer 3B was changed to 5 nm.

Comparative Example 2

The process was carried out in the same manner as in Example 1, except that the metal oxide layer 3A was not formed. That is, as shown in FIG. 3, the electrode 1 included the substrate film 2, the metal underlying layer 4, and the electrically conductive carbon layer 5 in order toward one side in the thickness direction.

Comparative Example 1

The process was carried out in the same manner as in Example 1, except that the order of forming the metal oxide layer 3A and the metal underlying layer 4 was replaced. That is, as shown in FIG. 4, the electrode 1 included the substrate film 2, the metal underlying layer 4, the metal oxide layer 3A, and the electrically conductive carbon layer 5 in order toward one side in the thickness direction.

<Evaluation>

Each of the electrodes 1 of Examples and Comparative Examples was evaluated based on the following items. The results are shown in Table 1.

<Electrolytic Solution Durability>

As shown by each phantom line in FIGS. 1, 3, and 4, an insulating tape 9 was attached to one surface in the thickness direction of the electrically conductive carbon layer 5. The insulating tape 9 had an opening portion 8 having a diameter of 2 mm.

The electrode 1 and the insulating tape 9 were immersed in 0.1 M of nitric acid solution for 56 days.

Figure 5A:
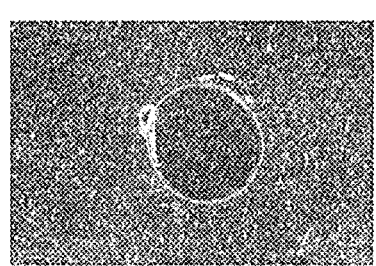
FIGS. 5A to 5B show an OM image of an electrode of Example 1.

The optical microscopic image of the electrode 1 and the insulating tape 9 before and after the immersion (hereinafter, referred to as OM image) is shown in FIGS. 5A to 8B. FIGS. 5 to 8 show Example 1 to Comparative Example 2, respectively. FIG. 5A is the electrode 1 before the immersion in Example 1. FIG. 5B is the electrode 1 after the immersion in Example 1. FIGS. 6A to 8B are the same as the above-described FIGS. 5A to 5B.

The electrolytic solution durability was evaluated from the OM image after the immersion based on the following criteria.

Figure 5B:
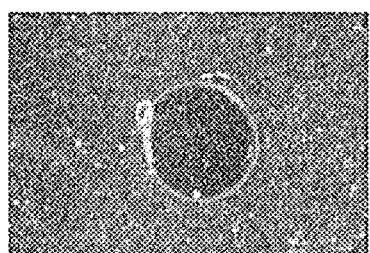

Excellent: as can be seen from FIG. 5B, a damaged portion due to pinhole formation was hardly observed.

Figure 6A:
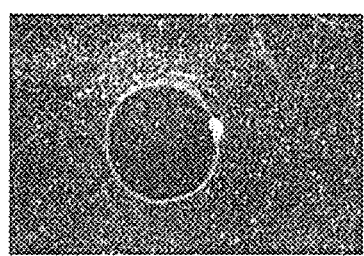
FIGS. 6A to 6B show an OM image of an electrode of Example 2.
Figure 6B:
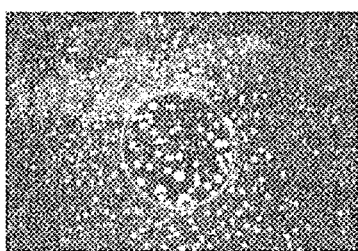

Good: as can be seen from FIG. 6B, a damaged portion due to pinhole formation was slightly observed.

Figure 7A:
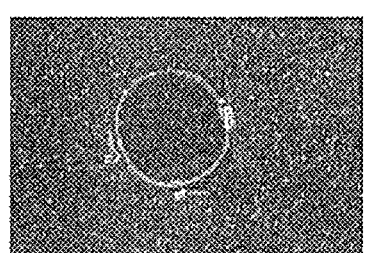
FIGS. 7A to 7B show an OM image of an electrode of Comparative Example 1.
Figure 7B:
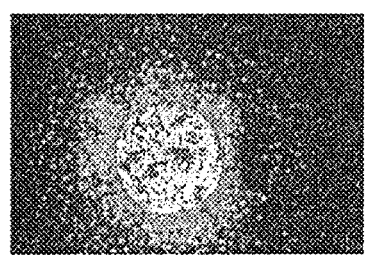
Figure 8A:
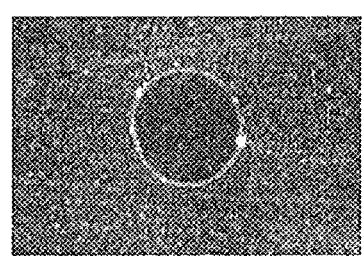
FIGS. 8A to 8B show an OM image of an electrode of Comparative Example 2.
Figure 8B:
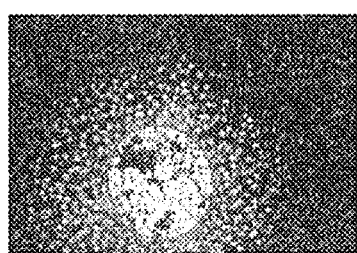

Bad: as can be seen from FIGS. 7B and 8B, a damaged portion due to pinhole formation was observed to a considerable extent.

<Electrode Properties>

A potential window of each of the electrodes 1 of Examples and Comparative Examples was measured using a potentiostat. Thus, the electrode properties of the electrode 1 were evaluated. The potential window means a voltage range in which no current flows even when a voltage is applied, and the wider the range, the more excellent the electrode properties of the electrode 1.

An electrochemical measurement system including the electrode 1 as a working electrode was constructed. The electrochemical measurement system included an Ag/AgCl electrode as a reference electrode and a Pt electrode as a counter electrode.

Thereafter, the electrode 1 was immersed in 0.1 M of sulfuric acid solution. Subsequently, an electric potential was swept with respect to the electrode 1, and the width of the electric potential when reaching 500 $\mu A/cm^2$ was defined as a potential window.

As can be seen in Table 1, in any of Example 1 to Comparative Example 2, since the potential window is 3.7 or more, the electrode properties of the electrode 1 before the immersion are excellent.

TABLE 1

| Ex.-Comparative Ex. | Correspondence Diagram | Layer Structure | Inorganic Oxide Layer | | Thickness of Inorganic Oxide Layer [nm] | Electrolytic Solution Durability | Range of Electric Window [V] |
|---|---|---|---|---|---|---|---|
| Ex. 1 | FIGS. 1, 2 | Electrically Conductive Carbon Layer/Metal Underlying Layer/Inorganic Oxide Layer/Substrate Film | Metal Oxide Layer | Titanium Oxide | 5 | Excellent | 3.8 |
| Ex. 2 | FIGS. 1, 2 | Electrically Conductive Carbon Layer/Metal Underlying Layer/Inorganic Oxide Layer/Substrate Film | Metal Oxide Layer | Titanium Oxide | 2 | Good | 3.8 |
| Ex. 3 | FIGS. 1, 2 | Electrically Conductive Carbon Layer/Metal Underlying Layer/Inorganic Oxide Layer/Substrate Film | Semi-Metal Oxide Layer | Silicon Dioxide | 10 | Excellent | 3.7 |
| Ex. 4 | FIGS. 1, 2 | Electrically Conductive Carbon Layer/Metal Underlying Layer/Inorganic Oxide Layer/Substrate Film | Semi-Metal Oxide Layer | Silicon Dioxide | 5 | Excellent | 3.7 |

TABLE 1-continued

| Ex.-Comparative Ex. | Correspondence Diagram | Layer Structure | Inorganic Oxide Layer | | Thickness of Inorganic Oxide Layer [nm] | Electrolytic Solution Durability | Range of Electric Window [V] |
|---|---|---|---|---|---|---|---|
| Comparative Ex. 1 | FIG. 3 | Electrically Conductive Carbon Layer/Inorganic Oxide Layer/Metal Underlying Layer/Substrate Film | Metal Oxide Layer | Titanium Oxide | 5 | Bad | 3.7 |
| Comparative Ex. 2 | FIG. 4 | Electrically Conductive Carbon Layer/Inorganic Oxide Layer/Substrate Film | Metal Oxide Layer | Titanium Oxide | | Bad | 3.7 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The electrode of the present invention is used, for example, in electrochemical measurement.

DESCRIPTION OF REFERENCE NUMERALS

1 Electrode
2 Substrate film
3 Inorganic oxide layer
3A Metal oxide layer
3B Semi-metal oxide layer
4 Metal underlying layer
5 Electrically conductive carbon layer

The invention claimed is:

1. An electrode comprising:
a substrate film, an inorganic oxide layer, a metal underlying layer, and an electrically conductive carbon layer in order toward one side in a thickness direction of the electrode,
wherein a carbon of the electrically conductive carbon layer has both $sp^2$ bonding and $sp^3$ bonding.

2. The electrode according to claim 1, wherein the metal underlying layer is capable of forming carbide of carbon of the electrically conductive carbon layer.

3. The electrode according to claim 1, wherein the inorganic oxide layer is a metal oxide layer.

4. The electrode according to claim 3, wherein the metal oxide layer and the metal underlying layer contain the same metal element.

5. The electrode according to claim 4, wherein the same metal element is titanium.

6. The electrode according to claim 1, wherein the inorganic oxide layer is a semi-metal oxide layer, and the semi-metal oxide layer contains silicon dioxide.

7. The electrode according to claim 6, wherein a thickness of the inorganic oxide layer is 5 nm or more.

8. The electrode according to claim 7, wherein the electrode is for electrochemical measurement.

9. The electrode according to claim 6, wherein the electrode is for electrochemical measurement.

10. The electrode according to claim 1, wherein a thickness of the inorganic oxide layer is 5 nm or more.

11. The electrode according to claim 10, wherein the electrode is for electrochemical measurement.

12. The electrode according to claim 1, wherein the electrode is for electrochemical measurement.

13. The electrode according to claim 1, wherein, in the electrically conductive carbon layer, a ratio ($sp^3/(sp^3+sp^2)$) of a number of $sp^3$-bonded atoms to a sum of the number of $sp^3$-bonded atoms and a number of $sp^2$-bonded atoms is 0.1 or more and 0.9 or less.

14. The electrode according to claim 1, wherein the inorganic oxide layer is a semi-metal oxide layer.

* * * * *